(12) United States Patent
Seok et al.

(10) Patent No.: US 9,309,413 B2
(45) Date of Patent: Apr. 12, 2016

(54) MULTI-COMPONENT THERMAL SPRAY COATING MATERIAL AND PRODUCTION METHOD AND COATING METHOD THEREOF

(71) Applicant: KOREA INSTITUTE OF SCIENCE AND TECHNOLOGY, Seoul (KR)

(72) Inventors: Hyun-Kwang Seok, Seoul (KR); Yu-Chan Kim, Gyeonggi-do (KR); Eun-Young Choi, Busan (KR); Kyeong-Ho Baik, Daejeon (KR); Kyung-Hun Byun, Seoul (KR); Hoon Jeong, Chungcheongbuk-do (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 4 days.

(21) Appl. No.: 13/915,976

(22) Filed: Jun. 12, 2013

(65) Prior Publication Data

US 2013/0344255 A1   Dec. 26, 2013

(30) Foreign Application Priority Data

Jun. 13, 2012 (KR) ........................ 10-2012-0063326

(51) Int. Cl.
| | | |
|---|---|---|
| C09D 5/08 | (2006.01) |
| C23C 4/00 | (2006.01) |
| C23C 4/10 | (2006.01) |
| C23C 4/12 | (2006.01) |
| C23C 28/00 | (2006.01) |

(52) U.S. Cl.
CPC ............... *C09D 5/084* (2013.01); *C23C 4/105* (2013.01); *C23C 4/127* (2013.01); *C23C 28/32* (2013.01); *C23C 28/3455* (2013.01); *C23C 28/36* (2013.01); *Y10T 428/2982* (2015.01)

(58) Field of Classification Search
CPC ........ C09D 5/084; C23C 4/105; C23C 4/127; C23C 28/32; C23C 28/36; C23C 28/3455
USPC .................................................... 106/14.21
See application file for complete search history.

(56) References Cited

U.S. PATENT DOCUMENTS

| | | | |
|---|---|---|---|
| 4,692,305 A | 9/1987 | Rangaswamy et al. | |
| 5,496,644 A | 3/1996 | Lee et al. | |
| 6,521,293 B1 * | 2/2003 | Kojima et al. | 427/250 |
| 6,930,066 B2 * | 8/2005 | Subramanian | 501/103 |
| 7,754,621 B2 * | 7/2010 | Putkonen | 438/785 |
| 7,776,383 B2 * | 8/2010 | Yadav et al. | 427/8 |
| 7,816,006 B2 * | 10/2010 | Yadav et al. | 428/402 |
| 8,728,967 B2 * | 5/2014 | Taylor et al. | 501/103 |
| 2008/0160172 A1 * | 7/2008 | Taylor et al. | 427/9 |
| 2013/0330507 A1 * | 12/2013 | Taylor et al. | 428/136 |
| 2014/0178632 A1 * | 6/2014 | Taylor et al. | 428/136 |
| 2014/0332747 A1 * | 11/2014 | Alekhin et al. | 257/2 |
| 2015/0079370 A1 * | 3/2015 | Sun et al. | 428/215 |

FOREIGN PATENT DOCUMENTS

| | | | | |
|---|---|---|---|---|
| JP | 06-065706 A | | 3/1994 | |
| JP | 06-065706 A | * | 3/1994 | ............... C23C 4/10 |
| JP | 06-277479 A | | 10/1994 | |
| JP | 2003-277051 A | | 10/2003 | |
| KR | 1020000039445 A | | 7/2000 | |
| KR | 100677956 B1 | | 1/2007 | |
| KR | 100939256 B1 | | 1/2010 | |
| KR | 100940812 B1 | | 1/2010 | |
| KR | 101030935 B1 | | 4/2011 | |
| KR | 101101910 B1 | | 12/2011 | |

OTHER PUBLICATIONS

Xian-Jing Ren, et al; "Materials Resistance to Liquid Zinc Corrosion on Surface of Sink Roll", Proceedings of Sino-Swedish Structural Materials Symposium; Sep. 17-19, 2007; pp. 130-136.

R. Ramos, et al; "Plasma/reactor walls interactions in advanced gate etching processes", Thin Solid Films, vol. 515, pp. 4846-4852; Available online Nov. 20, 2006.

Soo-Haeng Cho, et al; "Corrosion behaviour of $Y_2O_3$—$ZrO_2$ coatings on IN713LC in a LiCl—$Li_2O$ molten salt", Corrosion Science, vol. 52, pp. 2353-2364, Available onlinr Mar. 27, 2010.

* cited by examiner

*Primary Examiner* — Anthony J Green
(74) *Attorney, Agent, or Firm* — Ladas & Parry LLP

(57) ABSTRACT

Disclosed are a thermal spray coating material which greatly improves corrosion resistance, as compared to conventional $Al_2O_3$ and $Y_2O_3$ crystalline coatings and Al—Y—O and Al—Zr—O amorphous thermal spray coatings, a production method of the coating material, and a coating method using the same. The thermal spray coating material has a chemical formula of $Y_{2x}Zr_{1-x}O_{x+2}$, where x ranges from 0.19 to 0.83, preferably from 0.35 to 0.69. Accordingly, it is possible to produce a coating material for use in a chamber of vacuum plasmas equipment or internal parts of the chamber can be produced, which improves the corrosion resistance of a protective coating film upon ceramic thermal spray coating and lengthens the lifespan of parts.

5 Claims, 16 Drawing Sheets

MULTI-COMPONENT THERMAL SPRAY COATING MATERIAL AND PRODUCTION METHOD AND COATING METHOD THEREOF

CROSS-REFERENCE TO RELATED APPLICATION

This application claims priority to and the benefit of Korean Patent Application No. 10-2012-0063326 filed in the Korean Intellectual Property Office on Jun. 13, 2012, the entire contents of which are incorporated herein by reference.

BACKGROUND OF THE INVENTION (a) Field of the Invention

The present invention relates to a thermal spray coating material, and more particularly, the present invention relates to a multi-component thermal spray coating material which is used for parts of equipment used in corrosive environments found in semiconductor or display manufacturing equipment, chemical plants, power plants, etc.

(b) Description of the Related Art

Parts of equipment used in a corrosive environment require an excellent corrosion resistant coating in order to improve the durability of the equipment. Particularly, vacuum plasma equipment is widely used in semiconductor device processes or ultra-fine shaping processes. Examples of the use of vacuum plasma equipment include PECVD (Plasma Enhanced Chemical Vapor Deposition) equipment for forming a deposited film on a substrate by a chemical deposition method using plasma, sputtering equipment for forming a deposited film by a chemical method, and dry etching equipment for etching a substrate or a material coated on the substrate into a desired pattern.

The vacuum plasma equipment etches a semiconductor device or forms an ultra-fine shape by using high-temperature plasma. As such, high-temperature plasma is generated within the vacuum plasma equipment, thus easily damaging a chamber and internal parts thereof. Moreover, since particular elements or contaminant particles are generated from surfaces of the chamber and parts, there is a high possibility of contaminating the interior of the chamber.

Especially, in the case of the plasma etching equipment, a reactive gas containing F and Cl is injected under a plasma atmosphere, causing inner walls of the chamber and the internal parts to be exposed to a severely corrosive environment. Such corrosion primarily damages the chamber and the internal parts and secondarily generates contaminants and particles, causing an increase in a defect rate and degradation of products generated through a process within the chamber.

A vacuum plasma chamber and internal parts are selected in consideration of various characteristics, such as corrosion resistance, processability, ease of fabrication, price, insulation properties, etc. As a material of the vacuum plasma chamber, a metallic material such as a stainless alloy, aluminum (or an alloy thereof), or titanium (or an alloy thereof), etc., or a ceramic material such as $SiO_2$, Si, $Al_2O_3$, etc. is generally used. Preferably, the chamber is fabricated in an integral manner by casting, etc and then internally processed. Otherwise, the chamber may be fabricated by processing a number of parts and then assembling them, in consideration of productivity and manufacturing cost. For parts made of an Al alloy, a method in which an $Al_2O_3$ ceramic coating film is formed on a surface of a base material through an anodizing process is commonly employed. However, the ceramic coating film formed by this method has many defects therein, so it is difficult to expect high hardness and corrosion resistance and contaminant particles are generated at high rates.

For a variety of other metallic materials and ceramic materials to which the anodizing process is hardly applicable, a method of forming a protective film by using materials having high corrosion resistance to outside exposure and a low generation rate of contaminant particles (e.g., $Al_2O_3$, $Y_2O_3$, $ZrO_2$, AlC, TiN, AlN, TiC, MgO, CaO, $CeO_2$, $TiO_2$, BxCy, BN, $SiO_2$, SiC, etc) is employed. Recently, a method of forming a protective film using a heterogeneous ceramic material is employed even for Al-alloy materials to which the anodizing process is applicable. One of the most representative methods for forming a protective film using a heterogeneous ceramic material is a thermal spray coating method.

Thermal spray coating usually refers to a technique in which metal or ceramic powder is injected into a high-temperature heat source and heated, and then fully molten or semi-molten powder is laminated on the surface of a base material to form a coating film. This technique is classified into plasma thermal spray coating, HVOF (High velocity oxygen Fuel) coating, and so on depending on the type of heat source. Although $Al_2O_3$ and $Y_2O_3$ are the most widespread thermal spray coating materials commercially used nowadays, their corrosion resistance is not excellent and this leads to problems such as shortening the lifespan of parts and forming reaction products on the surfaces of the parts.

Meanwhile, the inventors of the present invention have recently suggested a novel technique regarding a new coating material that substantially overcomes the aforementioned problems of the ceramic thermal spray coating material and a coating method thereof. They have succeeded in forming the most part (50% or more, preferably, 100%) of a coating film in an amorphous phase by coating a multi-component ceramic material having three or more constituent elements by thermal spraying [Korean Patent Registration Nos. 10-0940812, 10-0939256, and 10-1101910]. Korean Patent Registration Nos. 10-0940812 and 10-0939256 suggested a patented technology that greatly improves corrosion resistance, as compared to conventional $Y_2O_3$ coatings, by mixing $Al_2O_3$ fine powder and $Y_2O_3$ fine powder into composite powder having an average diameter of 40 to 60 micrometers and then thermally spraying it to make the entire or most part of a coating film amorphous. Plasma corrosion resistance was greatly improved as shown in the following Table 1,

TABLE 1

|  | $Al_2O_3$ coating | $Y_2O_3$ coating | Al—Y—O coating |
|---|---|---|---|
| Microhardness(Hv) | 800-850 | 300-500 | 700-750 |
| Scratch Resistance (Sc. Depth, mm) | 1 | 10(Ext.)-22(Int.) | 1.2 |
| Corrosion Resistance in 2N HCl (Δg/g) | ~0 | 0.55 | 0.99-0.11 |
| ICP plasma etching resistance against F(μm/hr) | 4.632 | 1.213 | 0.215 |
| Dielectric constant | — | 1267(thin film) 15.1 (10 KHz)- 11.9 (1 MHz) (bulk) | 1254(thin film 16.1 (10 KHz)- 12.1 (1 MHz) (bulk) |
| Defects (Splat boundaries, pores) | many | very many | almost none |

Korean Patent Registration No. 10-1101910 suggested a technology which further improves corrosion resistance to Cl gas-containing plasma by preparing composite powder of $Al_2O_3$ fine powder and ZrO fine powder and then thermally spraying it to form an Al—Zr—O amorphous coating (see FIG. 1)

FIG. 2 shows the results of comparison of the etching rates of an Al—Zr—O amorphous coating and other coating materials in Cl gas-containing plasma when the coating condition is not optimally controlled. As shown in FIG. 2, the corrosion resistance of the Al—Zr—O amorphous coating is very sensitive to coating conditions. In some cases, the corrosion resistance of the Al—Zr—O amorphous coating may be higher than that of an Al—Y—O amorphous coating material under a Cl plasma gas atmosphere. That is, a coating material is coated at an applied power of 30 to 38 Kw (850 A and 45V) and a coating powder injection rate of 1.5 g/min, which is a general ceramic powder thermally spray coating condition, when argon gas and helium gas are respectively controlled at 38 L/min and 20 to 50 L/min to form plasma using an SG-100 plasma gun. Such a coating material shows a higher etching rate than the Al—Y—O amorphous coating.

The above-mentioned technology is to form the most part (50% or more, preferably, 100%) of a coating film in an amorphous phase by thermally spraying a multi-component ceramic material having three or more constituent elements. By doing so, volumetric shrinkage, which occurs when molten liquid droplets colliding with the surface of the base material are cooled and turn into a solid state upon thermal spray coating, is minimized. As a result, the formation of cracks, splat boundary gaps, and pores, which inevitably appear upon ceramic thermal spray coating, can be minimized, thereby enhancing the characteristics of the coating film.

Even though the aforementioned amorphous coating material has been greatly enhanced in plasma corrosion resistance, compared to conventional coating materials, it is still fragile in a process using corrosive Cl group-containing gas. Especially in recent years, there is a demand for higher corrosion resistance in process conditions in order to increase the production rate of semiconductor devices/displays. This creates a need for a new material technology which can further enhance corrosion resistance.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a coating material which greatly improves corrosion resistance, as compared to conventional $Al_2O_3$ and $Y_2O_3$ crystalline coatings and Al—Y—O and Al—Zr—O amorphous thermal spray coatings, especially under a Cl gas environment.

Furthermore, the present invention has been made in an effort to provide a method for producing the above-mentioned coating material with improved corrosion resistance.

Furthermore, the present invention has been made in an effort to provide a method for coating equipment and parts used in corrosive environments found in semiconductor or display manufacturing equipment, chemical plants, power plants, etc.

An exemplary embodiment of the present invention provides a thermal spray coating material having a chemical formula of $Y_{2x}Zr_{1-x}O_{x+2}$, where x ranges from 0.19 to 0.83, preferably from 0.35 to 0.69.

The thermal spray coating material may include powder diameter of 1 to 100 micrometers.

The coating material may be prepared by adding the $Al_2O_3$ powder, and the content of $Al_2O_3$ powder may be equal to or greater than 10% by weight and preferably does not exceed the content of ZrO powder.

A production method of a thermal spray coating material according to an exemplary embodiment of the present invention includes: preparing a material having a composition of $Y_{2x}Zr_{1-x}O_{x+2}$ by mixing $Y_2O_3$ powder having a diameter of 0.1 to 30 µm and ZrO powder having a diameter of 0.1 to 30 µm (where ranges from 0.19 to 0.83, preferably from 0.35 to 0.69); and preparing composite powder by spray-drying the prepared material. The method may further include static electricity to mix the $Y_2O_3$ powder and the ZrO powder to have electrostatic charges with different polarities.

In the mixing, $Al_2O_3$ powder having a diameter of 0.1 to 30 µm may be added. Preferably, the $Al_2O_3$ powder may be equal to or greater than 10% by weight of the total mixture while the content ratio of Y and Zr is maintained, and does not exceed the content of ZrO powder.

The method may further include heat-treating the powder at 900 to 1500° C.

A coating method of a thermal spray coating material according to an exemplary embodiment of the present invention may further include: preparing a thermal spray coating material having a composition of $Y_{2x}Zr_{1-x}O_{x+2}$ (where x ranges from 0.19 to 0.83, preferably from 0.35 to 0.69); injecting the thermal spray coating material into a plasma jet and heating the same; and forming a coating film by laminating the thermal spray coating material in a fully molten or semi-molten state on the surface of a base material.

The forming of a coating film may further include forming a metal intermediate layer.

The forming of a coating film may further include forming a gradient coating film by sequentially changing the composition of the thermal spray coating material.

A gradient coating film may be formed by a gradient coating method for sequentially changing the composition of the thermal spray coating material from a composition that is the same as a coated base material to a composition of $Y_{2x}Zr_{1-x}O_{x+2}$ (where x ranges from 0.19 to 0.83, preferably from 0.35 to 0.69) while the coating proceeds.

In the forming of a coating film, the base material may be a chamber of vacuum plasma equipment or a part inside the chamber.

According to the present invention, a coating material for use in a chamber of vacuum plasmas equipment or internal parts of the chamber can be produced, which improves the corrosion resistance of a protective coating film upon ceramic thermal spray coating and lengthens the lifespan of parts.

Particularly, a coating material can be produced which is improved in corrosion resistance under the etching atmosphere of Cl-group containing plasma.

DETAILED DESCRIPTION OF THE EMBODIMENTS

Figure 1:
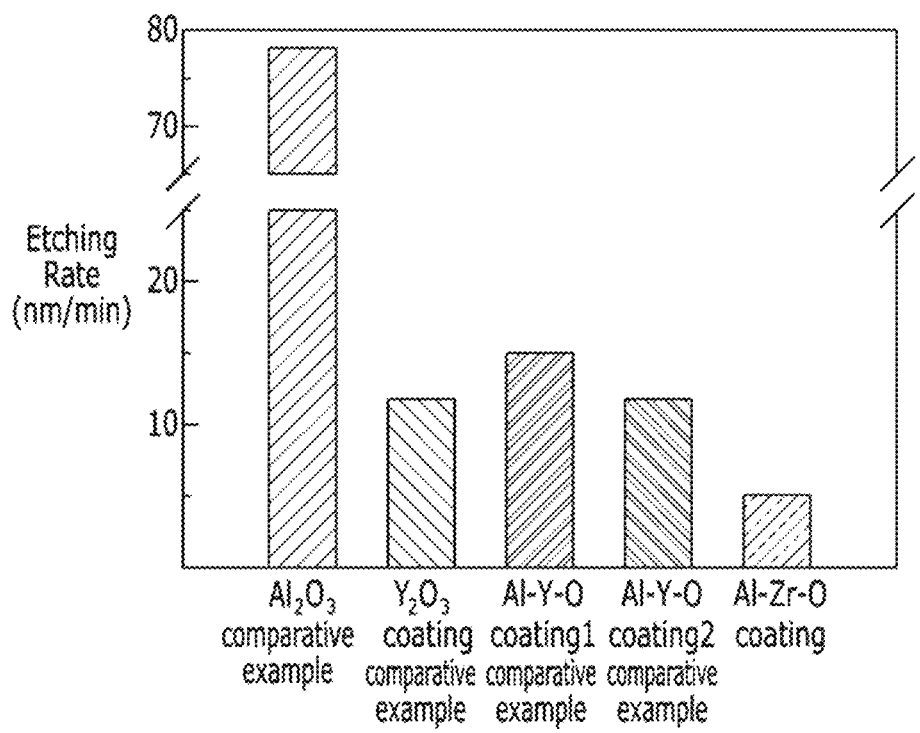
FIG. 1 shows the results of comparison of the etching rates of an Al—Zr—O amorphous coating and conventional coating materials in Cl gas-containing plasma.
Figure 2:
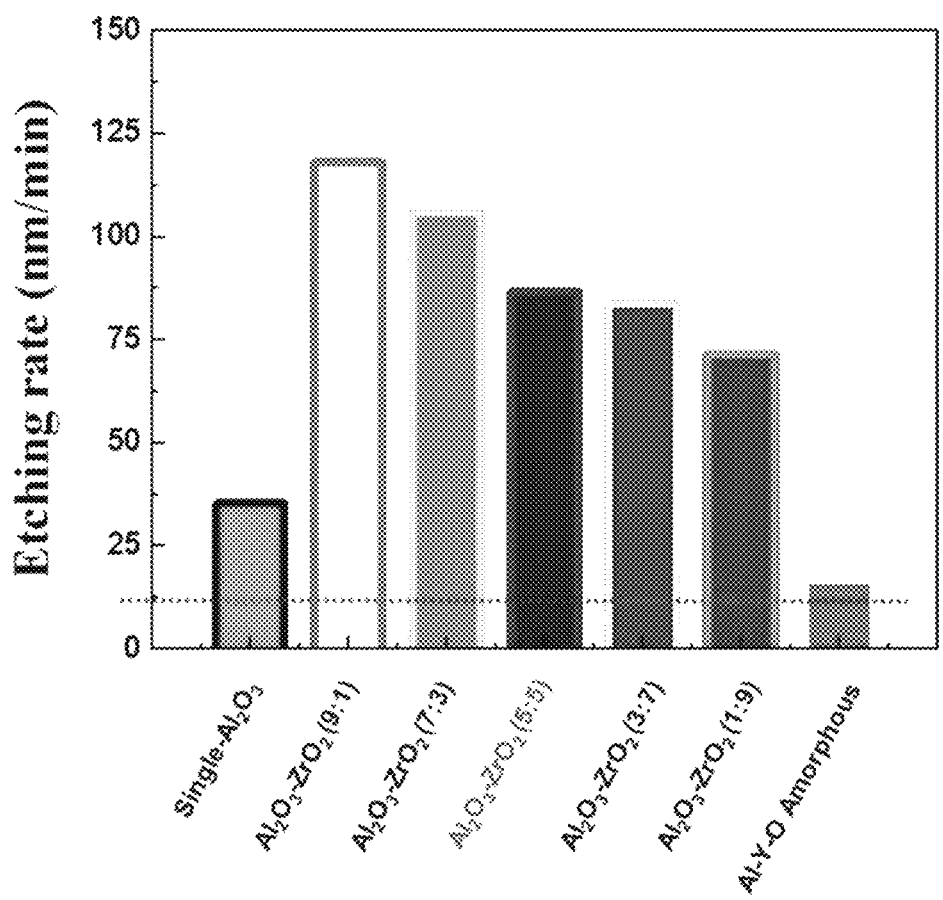
FIG. 2 shows the results of comparison of the etching rates of an Al—Zr—O amorphous coating and other coating materials in Cl gas-containing plasma when the coating condition is not optimally controlled.

Herein: i) the shapes, sizes, ratios, angles, numbers, operations of the parts may be varied to some extent from those shown in the accompanying drawings; ii) The directions and positions of the parts in the drawings may be widely varied according to the position of an observer since the drawings are seen from the eyes of the observer; iii) The same parts in different drawings may have the same reference numerals. v) Even if comparisons, positional relationships, etc. of the numerical values, sizes, and shapes are not described by 'approximately', they are interpreted to include a typical error range; iv) The terms "include(s)," "including," "has/have," "having," "consist(s) of," and "con- sisting of" are intended to mean that the parts may include additional sub-parts unless the term "only" is stated; iv) Although the parts are used in the singular in the drawings, they may be interpreted to be read as the plural form; vi) The comparison and positional relationships of the numbers, shapes and sizes and the like are intended to be included within the error range even though they are not described in the forms of "approximately," "substantially," etc. vii) Although the terms "after," "before," "then," "and," "here," "subsequently" and the like are used herein, they are not used with the meaning of defining their temporal positions. viii) The terms "first," "second" and the like are selectively, exchangeably or repeatedly used for simple classification, and are not intended to have a restrictive meaning. ix) When the terms "on/over," "below," "under," "beside" and the like are used to explain relationships, unless the term "directly" appears before the terms another element may be interposed between the elements thus described. x) When the parts are listed with the use of the term "or," they are intended to include the parts used alone and in combinations thereof, but are intended to include the parts used alone when they are listed with the use of the term "either . . . or."

A coating material according to an exemplary embodiment of the present invention has a composition of $Y_{2x}Zr_{1-x}O_{x+2}$ (where x ranges from 0.19 to 0.83, preferably from 0.35 to 0.69). The coating material is prepared by coating powder having a diameter of 1 to 100 micrometers by thermal spraying, and has the advantage of improving plasma etching resistance compared to conventional ceramic coating materials ($Y_2O_3$ or Al—Y—O coatings).

If the value x in the composition is less than 0.19 or exceeds 0.83, the coating film formed from the powder becomes less reactive to Cl group-containing plasma and this leads to lower corrosion resistance. Here, the amount of oxygen may be varied depending on flame temperature, spraying distance, etc in the thermal spraying.

Moreover, composite powder is prepared in such a manner that the powder having the aforementioned composition contains 10% of $Al_2O_3$ by weight and the content of $Al_2O_3$ does not exceed the content of ZrO, and then coated by thermal spraying. As a result, corrosion resistance can be additionally improved.

Hereinafter, a production method and coating method of a coating material according to an exemplary embodiment of the present invention will be described.

In the production method of a coating material according to an exemplary embodiment of the present invention, a coating film showing great improvement in resistance compared to conventional coating materials is provided through the steps of: mixing $Y_2O_3$ fine powder (diameter: 0.1 to 30 μm) and ZrO fine powder (diameter: 0.1 to 30 μm) into a material having a composition of $Y_2$—$Zr_{1-x}O_{x+2}$ (x ranges from 0.19 to 0.83); adding $Al_2O_3$ powder (diameter: 0.1 to 30 μm) if required; preparing composite powder by spray-drying the mixture material; and coating the spray-dried composite powder by thermal spraying.

To improve the properties of the coating material, a technique for uniformly dispersing raw powder, a post-processing technique for improving the strength of spray-dried composite powder coating, and so forth can be additionally carried out.

In the spray-drying method used in the present invention, one or two types of powder are prepared at a specific mixing ratio, and mixed with a solvent, a binding agent, a dispersing agent, etc. The binding agent and the dispersing agent may not be added according to necessity. The mixture is sprayed in a gas state, such as air, at a temperature of 70 to 80° C., or distributed through fine grooves formed on a disk rotating at high speed, thereby preparing powder having a diameter of 1 to 200 μm.

The solvent used may be a mixed solution of one or more of water, acetone, and isoprophyl alcohol, the dispersing agent may be high molecule polymer, and the binding agent may be polymer (PVB76) or benzyl butyl phthalate.

Figure 3:
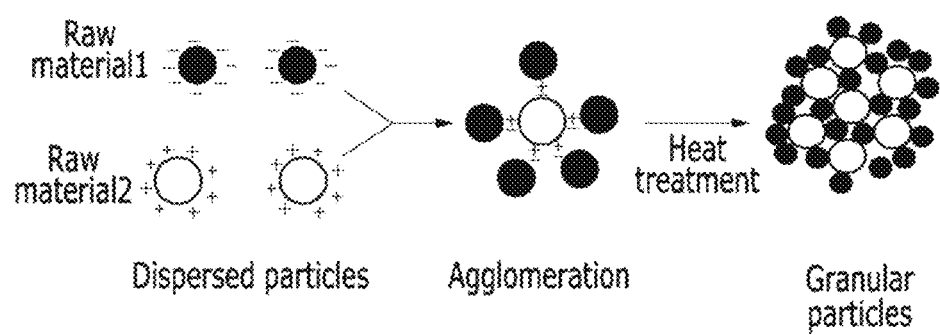
FIG. 3 is a schematic diagram of a method for producing powder in a uniformly mixed state by inducing different types of powder to have electrostatic charges with different polarities.

The aforementioned step of mixing powder may further include the step of applying static electricity to induce different types of powder to have electrostatic charges with different polarities as disclosed in FIG. 3. If the $Y_2O_3$ powder and the ZrO powder are simply mechanically mixed, the mixture would not be uniform. Nevertheless, the two types of powder can be mixed uniformly because the two particle types have different electrostatic charges in a solvent with a particular acidity (e.g., ph 6).

Since the powder prepared by the spray-drying method has low strength, the step of heating the powder in a temperature range of 900 to 1500° C. can be further carried out. Through the heating step, the solvent, the binding agent, the dispersing agent, etc are vaporized, and only ceramic powder remains. The remaining ceramic powder is sintered, thus improving the strength of the powder. In some cases, the heat treatment step may be omitted, and the next step may be instead carried out.

Next, a method for coating a coating material according to an exemplary embodiment of the present invention will be described.

Figure 4:
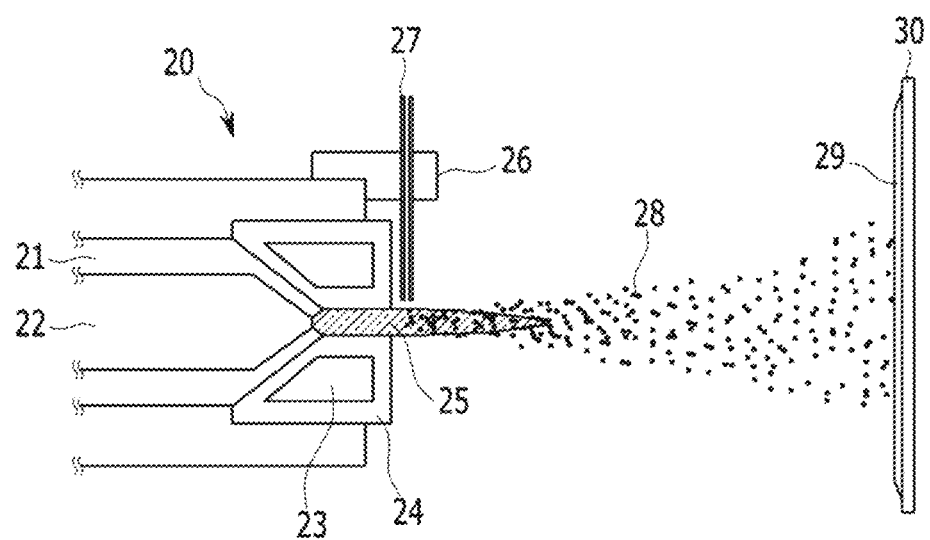
FIG. 4 is a schematic diagram of a plasma gun included in plasma thermal spraying equipment.

The coating method according to the exemplary embodiment of the present invention may be a thermal spray coating method. FIG. 4 is a schematic diagram of a plasma gun for thermal spraying. The operating principle of the plasma gun used in the present invention will be described below.

First of all, as a plasma gas (Ar, N, H, He, etc) is introduced through a gas injection hole 21, and while the plasma gas passes through a gap between an anode 22 and a cathode 24, to which high power (generally 30V to 100 V and, 400 A to 1000 A) has been applied, a portion of the injected gas is disassociated to form a plasma jet 25 with a high temperature of 5,000 to 15,000° C. In order to prevent corrosion of an end portion, which is a plasma generated portion of the cathode 22, the cathode 22 is generally made of tungsten or a tungsten-tempered metallic material. The anode 24 is made of copper or a copper alloy and includes a cooling passage 23 therein to prevent the life span of the anode from being shortened by the high temperature plasma. A homogeneous or heterogeneous material may be coated on surfaces of various materials such as metal or ceramics by using the plasma thermal spraying method, and as the coating material, a metal or ceramic made of powder or wire may be used. Next, a material to be coated is prepared in the form of powder, which is then injected into the plasma jet 25 through a powder injection hole 27. The powder injection hole 27 may be fixed in the plasma gun by means of a support 26 (referred to as "external type", hereinafter), or may be installed at the anode 24 (referred to as "internal type", hereinafter).

The powder injected through the powder injection hole 27 becomes completely molten or partially molten because of the high temperature plasma jet, and the completely molten or partially molten powder moves toward a base material 30 at a high speed (200 m/s to 1000 m/s), to form a coating film 29. In the case of an oxide ceramic material, it may be subjected to plasma thermal spray coating in the atmosphere, but in the case of a metallic material or a material such as a carbide or nitride, etc., which is oxide-reacted or readily decomposed at a high temperature, it is subjected to the plasma thermal spray coating within a vacuum/low pressure chamber.

First, powder for coating is prepared. As the ceramic powder to be used for thermal spray coating, a powder particle with a size of 1 to 100 μm according to the exemplary embodiment of the present invention may be used. 1 to 100 μm. Preferably, the powder particle size ranges from 20 to 60 μm.

Next, such a single powder particle or coagulated powder is injected into the plasma jet 25. The injected powder is heated by the plasma jet 25, dissipated, and laminated on the surface of the base material 30. When laminated, the laminated powder is rapidly cooled to form a coating film 29.

Various operational conditions may be set to ensure a stable coating operation and improve characteristics of the coating material. The operating conditions may vary depending on the employed equipment and the size and type of the coating powder used.

The step of forming a coating film by thermal spraying may further include the step of forming a metal intermediate layer.

Moreover, the step of forming a coating film may further include the step of forming a gradient coating film by sequentially changing the composition of the thermal spray coating material.

Further, a gradient coating film can be formed by a gradient coating method for sequentially changing the composition of the thermal spray coating material from a composition that is the same as or similar to a coated base material to a target composition while the coating proceeds.

Experimental Example

Hereinafter, the present invention will be described in further detail through experimental examples. First, various coating materials listed in Table 2 were prepared in a form in which thermal spraying coating is applicable, and then coated by thermal spraying to develop a coating material having excellent corrosion resistance.

TABLE 2

| No | coating type | coating method |
|---|---|---|
| 1 | $Al_2O_3$ coating | thermal spraying |
| 2 | Al—Y—O amorphous coating | thermal spraying |
| 3 | $Al_2O_3$—$TiB_2$ coating(mixing ratio of 1:1) | thermal spraying |
| 4 | $Al_2O_3$—$WO_3$ coating(mixing ratio of 1:1) | thermal spraying |
| 5 | AlN, $Al_4C_3$, $AlB_2$ coating | thermal spraying |
| 6 | $B_4C$, BN, $B_2O_3$ coating | thermal spraying |
| 7 | $Al_2O_3$—BN(mixing ratio: 1:1) coating | thermal spraying |
| 8 | $TiO_2$, $TiB_2$, TiC, $Ti_2CN$, TiN coating | thermal spraying |
| 9 | $WO_3$ | thermal spraying |
| 10 | $Y_2O_3$ coating | thermal spraying |

The conditions of powder preparation are as follows: droplets were dried as soon as they were formed, a co-current flow chamber for supplying hot air upon atomization was used to obtain spherical powder, the inlet temperature and the outlet temperature, which are basic process variables, were fixed to 108° C. and 120° C., respectively, and stirred slurries of micron size ceramic powder, a binding agent, and a dispersing gent were controlled to 25 liter/hour and spray-dried at a disk rotating speed of 15,000 rpm.

Figure 5:
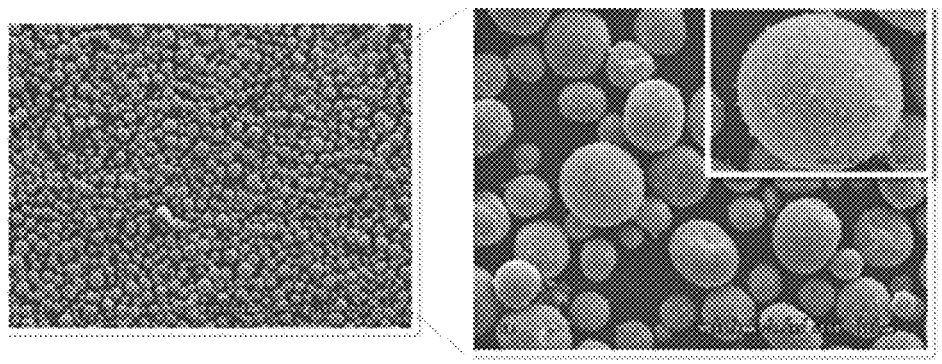
FIG. 5 shows scanning electron micrographs (SEM) of composite powder which is prepared by mixing $Al_2O_3$ fine powder and $WO_3$ fine powder.
Figure 6:
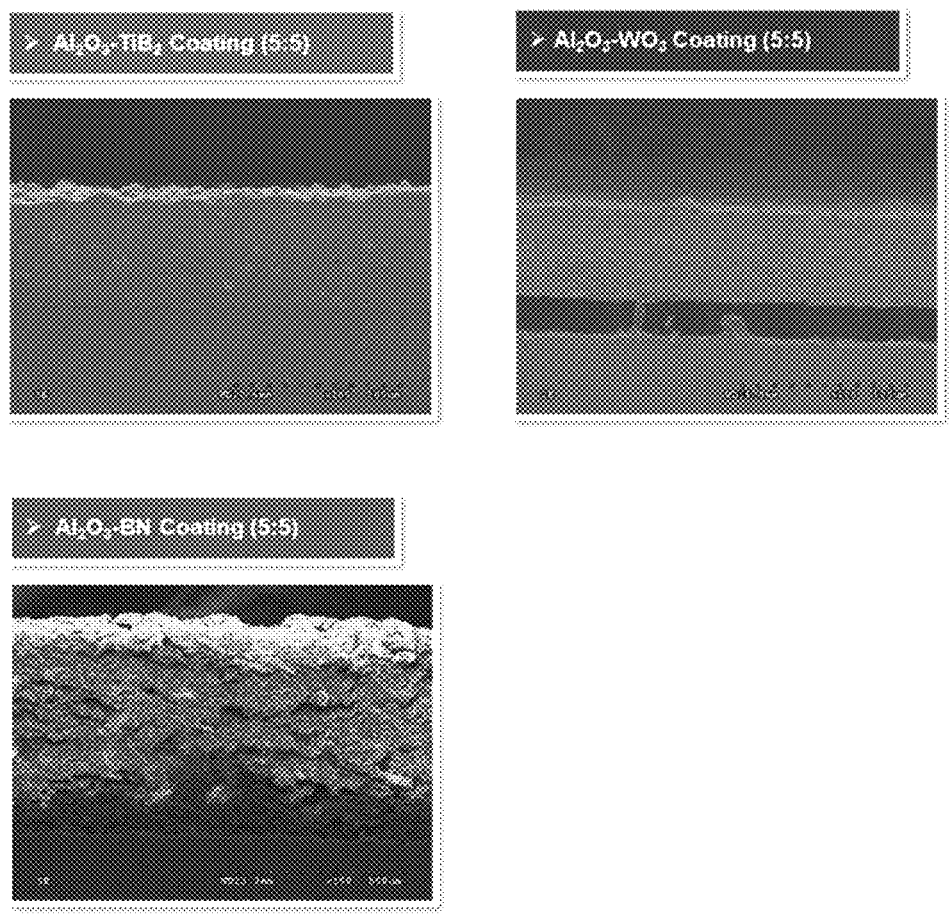
FIG. 6 is a cross-sectional scanning electron micrograph (SEM) of an $Al_2O_3$—$TiB_2$ coating (mixing ratio of 1:1), an $Al_2O_3$—$WO_3$ coating (mixing ratio of 1:1), and an $Al_2O_3$—BN coating (mixing ratio of 1:1).

FIG. 5 shows scanning electron micrographs (SEM) of composite powder which is prepared by mixing $Al_2O_3$ fine powder and $WO_3$ fine powder and spray-drying the mixture and used to form the thermal spray coating material No. 4. The other types of thermal spray coating powder have similar shapes, so descriptions thereof will be omitted. The only difference is that the powder used to form the coating materials Nos. 1, 9, and 10 were made of granules having a diameter of about 40 to 50 microns. Among those coating types, Nos. 1, 2, and 10 are well-known materials and prepared into comparative coating materials.

Figure 7:
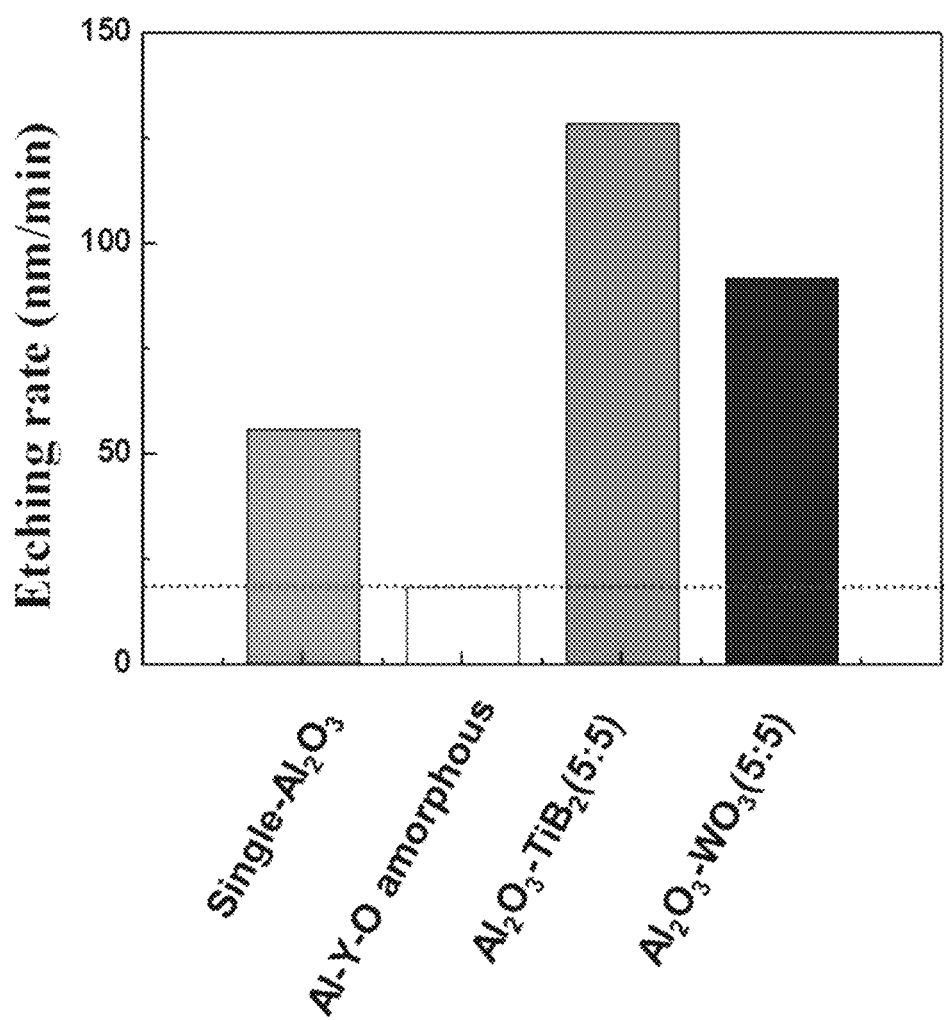
FIG. 7 shows the measurement results of the etching resistance of the $Al_2O_3$—$TiB_2$ coating (mixing ratio of 1:1) and the $Al_2O_3$—$WO_3$ coating (mixing ratio of 1:1).
Figure 8:
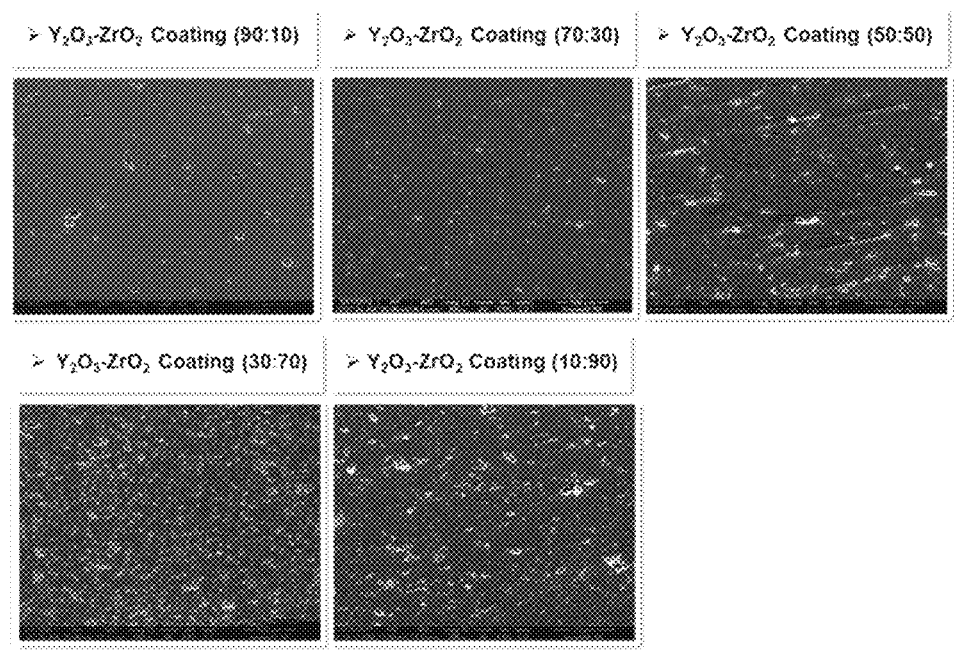
FIG. 8 shows scanning electron micrographs (SEM) of an $Y_2O_3$—$ZrO_2$ coating layer observed after abrasion according to an exemplary embodiment of the present invention.

The prepared powder was coated by thermal spraying. In the experimental example of the present invention, the "PT-800" power application system manufactured by Plasma Tech, Switzerland, and the "SG-100" plasma gun manufactured by Praxair Co., U.S.A., were used to supply power to the plasma gun. To form plasma, argon gas and hydrogen gas were used, and the amounts of the gases were controlled to be 40 liter/min and 20 to 50 liter/min, respectively. Applied power was 30 to 36 Kw (850 A, 45V), and the injection speed of the coating powder was 15 g/min. The distance between the plasma gun and the coating target material was about 120 mm. Among the aforementioned materials, Nos. 5, 6, 8, and 9 were not laminated on the surface of the base material, thus making it impossible to form coating materials. Although Nos. 3, 4, and 7 were formed as shown in FIG. 8, coating layers made of Nos. 4 and 7 were very fragile and separated from the base material, which made it possible to form proper coatings. FIG. 7 shows the measurement results of the etching resistance of the $Al_2O_3$—$TiB_2$ coating (mixing ratio of 1:1) and the $Al_2O_3$—$WO_3$ coating (mixing ratio of 1:1). No. 3 looked properly coated on exterior, which, however, did not meet the purpose of the present invention because the etching rate of No. 3 was higher than that of the Al—Y—O amorphous coating, as shown in FIG. 7, when No. 3 was corroded by Cl gas-containing plasma by the aforementioned method.

Next, Y—Zr—O coatings according to an exemplary embodiment of the present invention were formed under the same condition except their compositions. The compositions of these coatings are as shown in Table 3.

TABLE 3

| No | coating type | coating composition (wt. %) |
|---|---|---|
| 1 | $Y_2O_3$—$ZrO_2$ coating | $Y_2O_3$:$ZrO_2$ = 90:10 |
| 2 | $Y_2O_3$—$ZrO_2$ coating | $Y_2O_3$:$ZrO_2$ = 70:30 |
| 3 | $Y_2O_3$—$ZrO_2$ coating | $Y_2O_3$:$ZrO_2$ = 50:50 |
| 4 | $Y_2O_3$—$ZrO_2$ coating | $Y_2O_3$:$ZrO_2$ = 30:70 |
| 5 | $Y_2O_3$—$ZrO_2$ coating | $Y_2O_3$:$ZrO_2$ = 10:90 |

Composite powder of each composition was prepared by the above-said spray-drying method and then coated by thermal spraying, and the surface of the coating material was abraded and observed. FIG. 8 shows scanning electron micrographs (SEM) of an $Y_2O_3$—$ZrO_2$ coating layer observed after abrasion according to an exemplary embodiment of the present invention. As shown in FIG. 8, some pores were observed in the coating layer.

Figure 9:
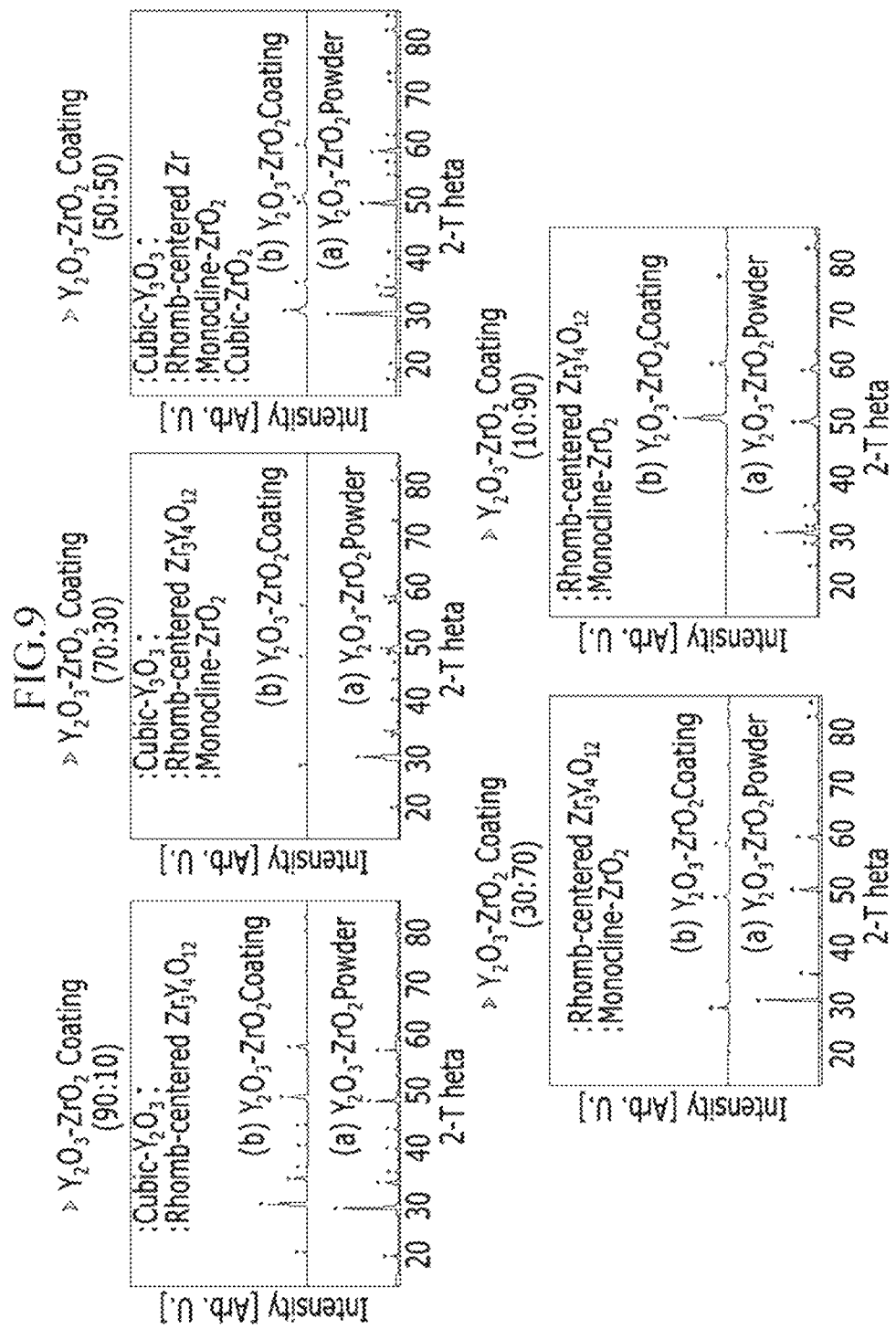
FIG. 9 shows the results of X-ray diffraction analysis of an $Y_2O_3$—$ZrO_2$ coating layer according to an exemplary embodiment of the present invention.
Figure 10:
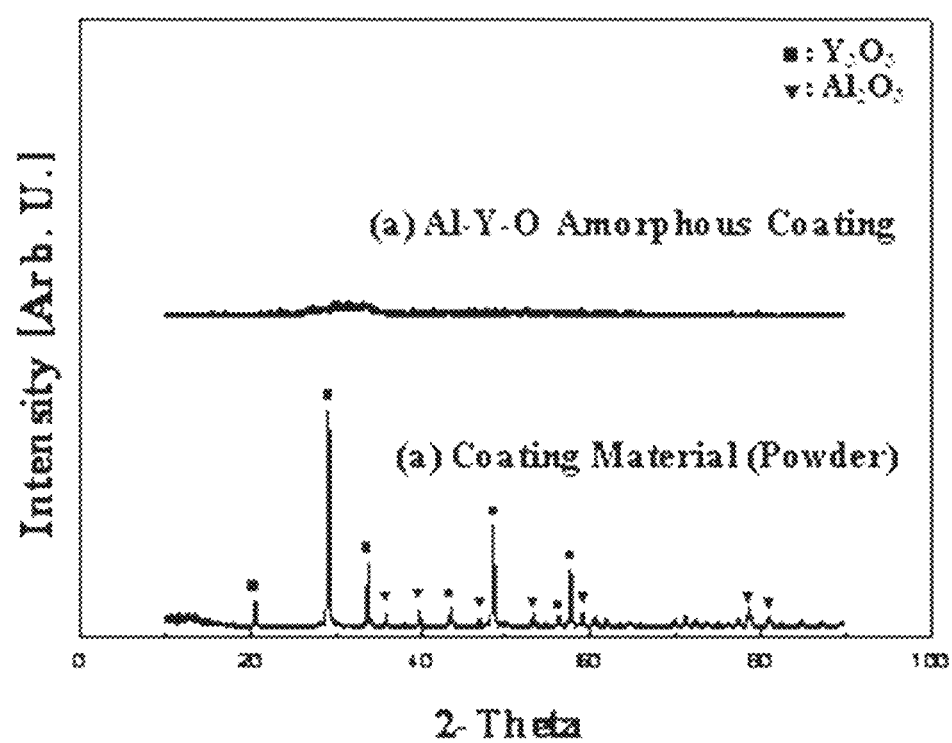
FIG. 10 shows the results of X-ray diffraction analysis of an Al—Y—O amorphous coating of Comparative Example and a coating material.

Each coating layer was analyzed by an X-ray diffraction method. FIG. 9 shows the results of X-ray diffraction analysis of the $Y_2O_3$—$ZrO_2$ coating layer according to an exemplary embodiment of the present invention. Crystalline peaks were observed in most cases even after the coating process. Particularly, it can be seen that crystalline peaks appear at the mixing ratio of 70:30 of $Y_2O_3$ and $ZrO_2$ at which the crystalline peaks have relatively low strength. This shows that, as shown in FIG. 10, the $Y_2O_3$—$ZrO_2$ coating has a different crystalline structure from that of the amorphous coatings previously suggested by the inventors [Korean Patent Registration Nos. 10-0940812, 10-0939256, and 10-1101910].

An etching test was conducted on the $Y_2O_3$—$ZrO_2$ coating under the conditions shown in the following Table 4.

TABLE 4

| | |
|---|---|
| Plasma power(W) | 800 |
| Bias power(W) | 0 |
| BCl3(sccm) | 100 |
| Cl2(sccm) | 100 |
| Pressure(mTorr) | 20 |
| Runtimes(s) | 900 |

Figure 11:
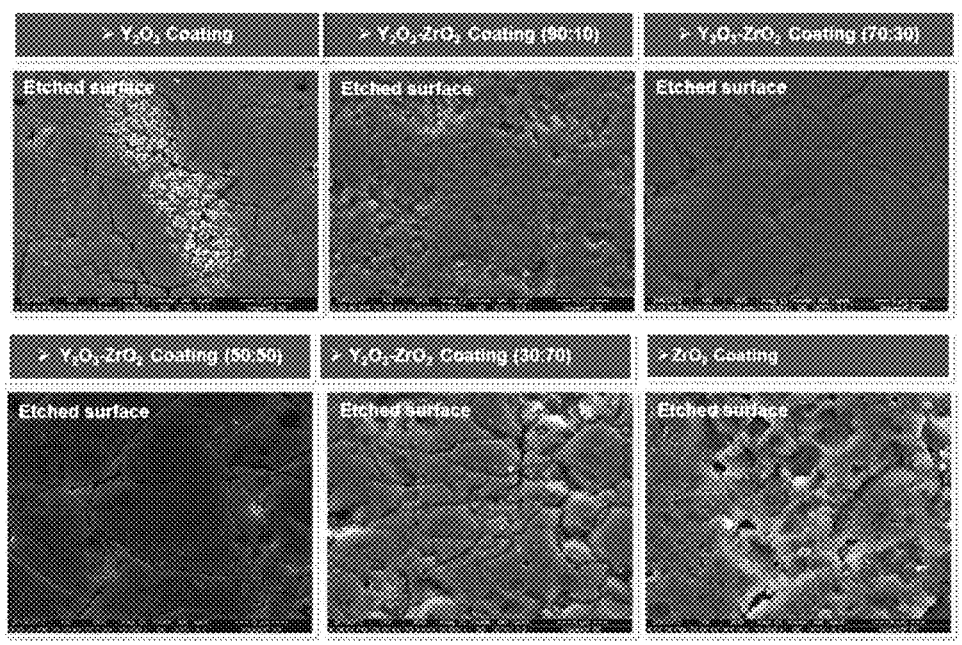
FIG. 11 shows scanning electron micrographs (SEM) of the surface of an $Y_2O_3$—$ZrO_2$ coating material according to an exemplary embodiment of the present invention.
Figure 12:
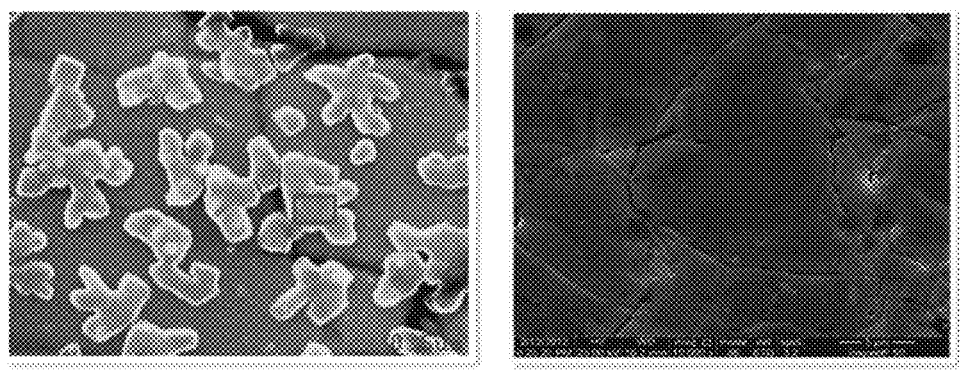
FIG. 12 shows enlarged scanning electron micrographs (SEM) of reaction products on the surface of the $Y_2O_3$ coating material of FIG. 11.
Figure 13:
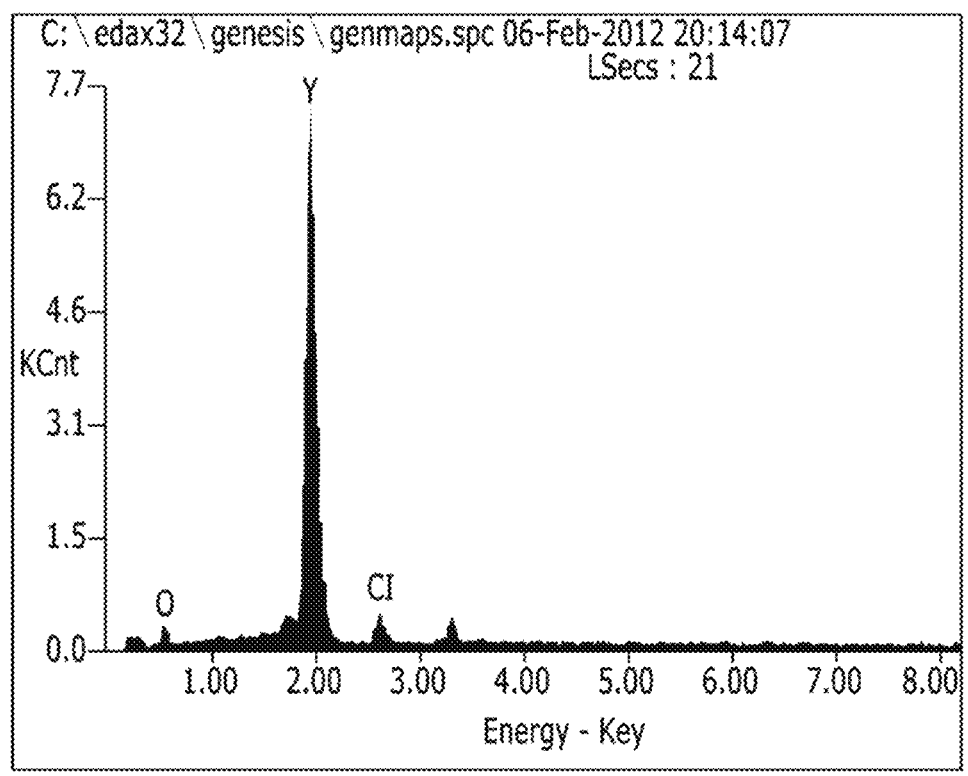
FIG. 13 shows the results of analysis of the reaction products on the surface of the $Y_2O_3$ coating material conducted by XPS (X-ray Photoelectron Spectroscopy).

FIG. 11 shows the surface of the coating after etching under the above conditions. FIG. 12 shows enlarged scanning electron micrographs (SEM) of reaction products on the surface of the $Y_2O_3$ coating material of FIG. 11. As shown in FIG. 11, no reaction products were observed on the surface of a coating material formed of an $Y_2O_3$—$ZrO_2$ composite material. On the other hand, reaction products of around 1 micrometer were observed on the surface of the $Y_2O_3$ coating of Comparative Example. To determine the composition of the reaction products, the reaction products were analyzed by XPS. FIG. 13 shows the result of analysis of the reaction products on the surface of the $Y_2O_3$ coating conducted by XPS. Based on the presence of Y and Cl, it can be seen that the reaction products are yttrium chloride.

Corrosion resistance, which is one of the most important properties of this coating material, was measured under the conditions of Table 4. The etching rates were calculated by measuring the level difference between an unetched portion formed by masking the surface of the coating material and an etched portion by exposing the surface of the coating material to corrosive gas, and then dividing it by exposure time. The measurement results were shown in FIG. 14.

Figure 14:
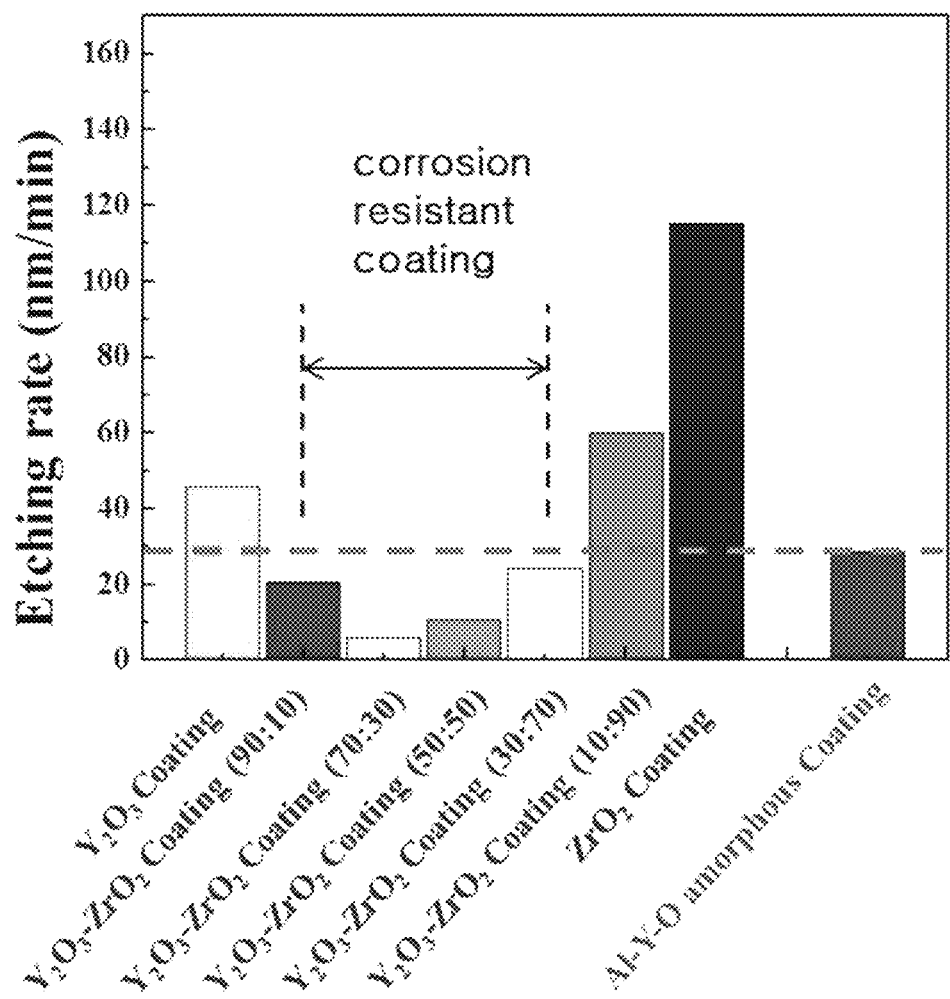
FIG. 14 shows the results of comparison of the etching rates of the $Y_2O_3$—$ZrO_2$ coating and comparative materials depending on the compositions of the $Y_2O_3$—$ZrO_2$ coating according to an exemplary embodiment of the present invention.

As shown in FIG. 14, the etching rate of the $Y_2O_3$—$ZrO_2$ coating was improved when the mixing ratio is within the range of 90:10 to 30:70, as compared to the conventional Al—Y—O amorphous coating, and was the lowest at the mixing ratio of 70:30 of $Y_2O_3$ and $ZrO_2$, which is the most preferable condition. The etching rate obtained was about 6 nm/min, which is only 20% of the etching rate (29 nm/min) of the Al—Y—O amorphous coating suggested in Korean Patent Registration Nos. 10-0940812 and 10-0939256.

Figure 15:
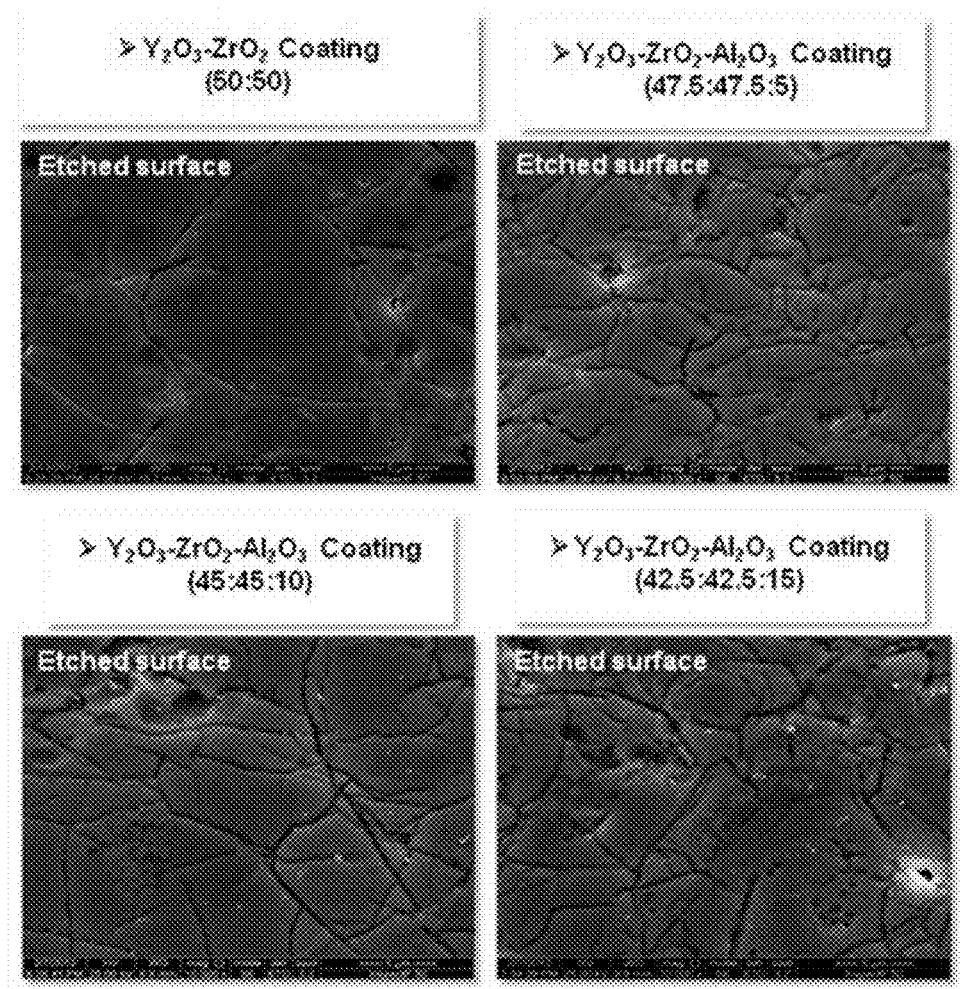
FIG. 15 shows scanning electron micrographs (SEM) of a coating material obtained after an etching test, the coating material being prepared by adding $Al_2O_3$ to $Y_2O_3$—$ZrO_2$ to form powder and coating the powder by thermal spraying according to an exemplary embodiment of the present invention.

Next, composite powder including three different types of materials was prepared by mixing $Y_2O_3$ and $ZrO_2$ at a mixing ratio of 1:1 and adding $Al_2O_3$ powder to the mixture at 5, 10, and 15% of the total weight, and the composite powder was coated by thermal spraying. FIG. 15 shows scanning electron micrographs (SEM) comparing an etched surface of the coating material and an etched surface of the $Y_2O_3$—$ZrO_2$ coating material.

Figure 16:
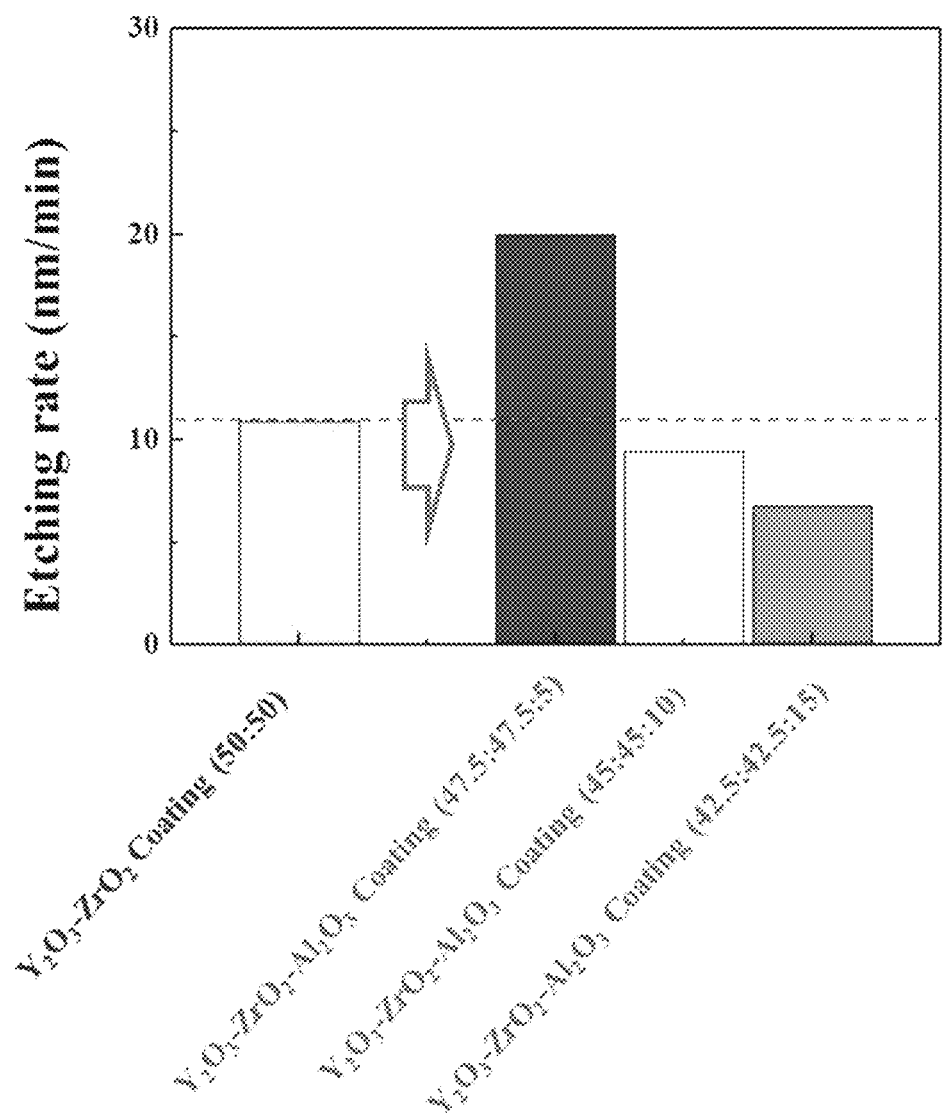
FIG. 16 shows the measurement results of the etching rate of the coating material prepared by adding $Al_2O_3$ to $Y_2O_3$—$ZrO_2$ to form powder and coating the powder by thermal spraying according to an exemplary embodiment of the present invention.

As can be seen from FIG. 16, the frequency of generation of cracks increases when $Al_2O_3$ is added. Moreover, as shown in FIG. 16, the measurement results of the etching rates showed an increase in etching rate when $Al_2O_3$ was added at 5% of the total mixture, but showed a decrease in etching rate when $Al_2O_3$ was added at 10% or more of the total mixture. Accordingly, it is expected that a more preferable coating layer might be obtained by adding 10% or more of $Al_2O_3$ powder to the composite powder prepared at the aforementioned mixing ratio (i.e., the mixing ratio of $Y_2O_3$ and $ZrO_2$ ranges from 90:10 to 30:70). However, if the content of $Al_2O_3$ exceeds the content of ZrO, the resulting mixture becomes an $Y_2O_3$—$Al_2O_3$ coating. Consequently, the maximum content of $Al_2O_3$ to be added does not exceed the content of the second additive material.

Based on this, it can be found out that the Y—Zr—O and Y—Zr—Al—O coatings suggested in the present invention have higher etching resistance than all of the coating materials presented in Comparative Examples; especially, the corrosion resistance of the Y—Zr—O and Y—Zr—Al—O coatings was improved by 500% or more compared to the conventional materials under the etching atmosphere of Cl group-containing plasma, which has been, in recent years, the biggest problem. Therefore, it is concluded that the Y—Zr—O and Y—Zr—Al—O coatings can serve as protective coating materials which are very useful for equipment and objects used under a corrosive atmosphere. That is, it can be seen that corrosion resistance can be further improved by preparing composite powder in such a manner that it has a composition of $Y_{2x}Zr_{1-x}O_{x+2}$ (where x ranges from 0.19 to 0.83, preferably from 0.35 to 0.69), 10% or more of $Al_2O_3$ by weight is added to the total mixture while the content ratio of Y and Zr is maintained, and the content of $Al_2O_3$ does not exceed the content of ZrO.

It is to be noted that the composition ratio of Y:Zr:O or Y:Zr:Al:O in the composition formula of the coating material suggested in the present invention may not be quite identical to the composition ratio suggested in the present invention. This is because the composition of the raw ceramic powder used may be partially different from the composition formula of $Y_2O_3$, $ZrO_2$, or $Al_2O_3$, which are chemically stable, or the composite powder may be decomposed by high-temperature heat while passing through a super high-temperature plasma jet to vaporize oxygen, resulting in slight changes in the composition ratios.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A thermal spray coating material which is improved in corrosion resistance and has a chemical formula of $Y_{2x}Zr_{1-x}O_{x+2}$ (where x ranges from 0.19 to 0.83).

2. The thermal spray coating material of claim 1, wherein x ranges from 0.35 to 0.69.

3. The thermal spray coating material of claim 1, wherein the thermal spray coating material comprises powder having a diameter of 1 to 100 μm.

4. The thermal spray coating material of claim 1, wherein the coating material further comprises $Al_2O_3$.

5. The thermal spray coating material of claim 4, wherein content of the $Al_2O_3$ is equal to or greater than 10% by weight and does not exceed content of ZrO.

* * * * *